Feb. 24, 1970  F. L. BOYS  3,497,322
NITROGEN DETECTOR
Filed March 30, 1966  2 Sheets-Sheet 1
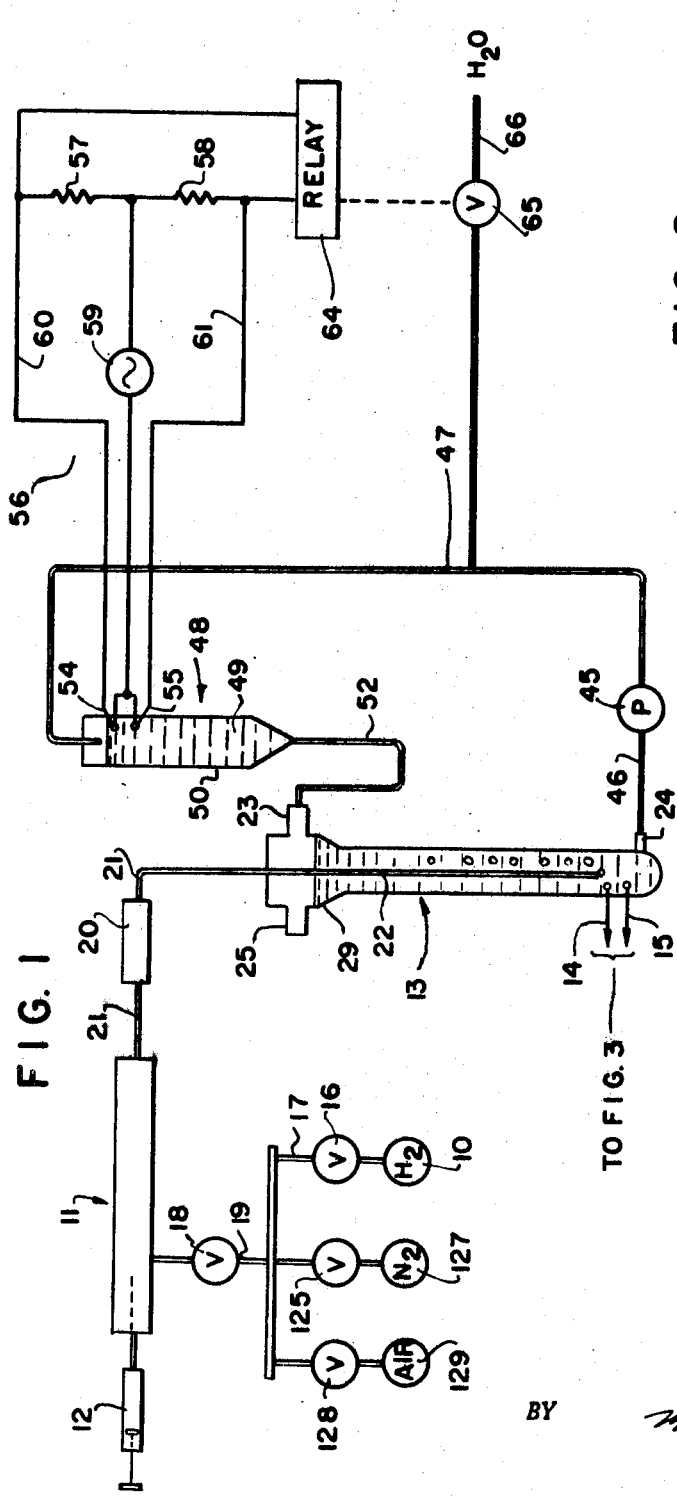
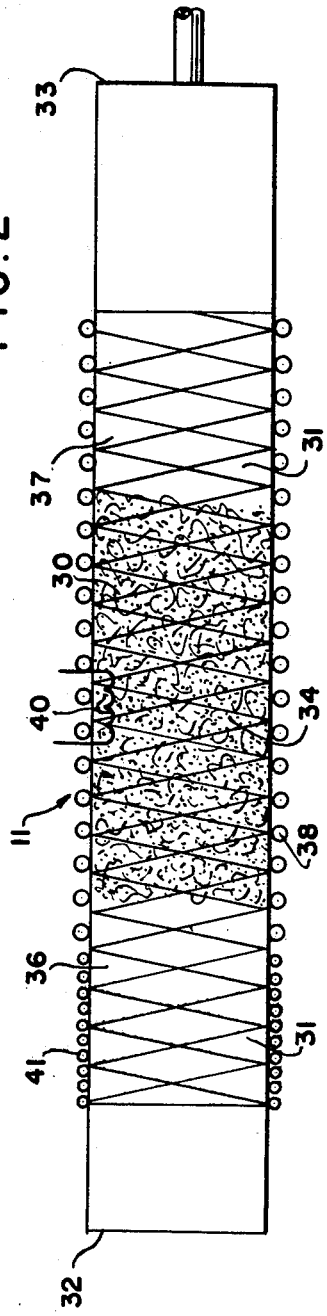
INVENTOR.
FAY L. BOYS
BY McLean, Morton & Boustead
ATTORNEYS

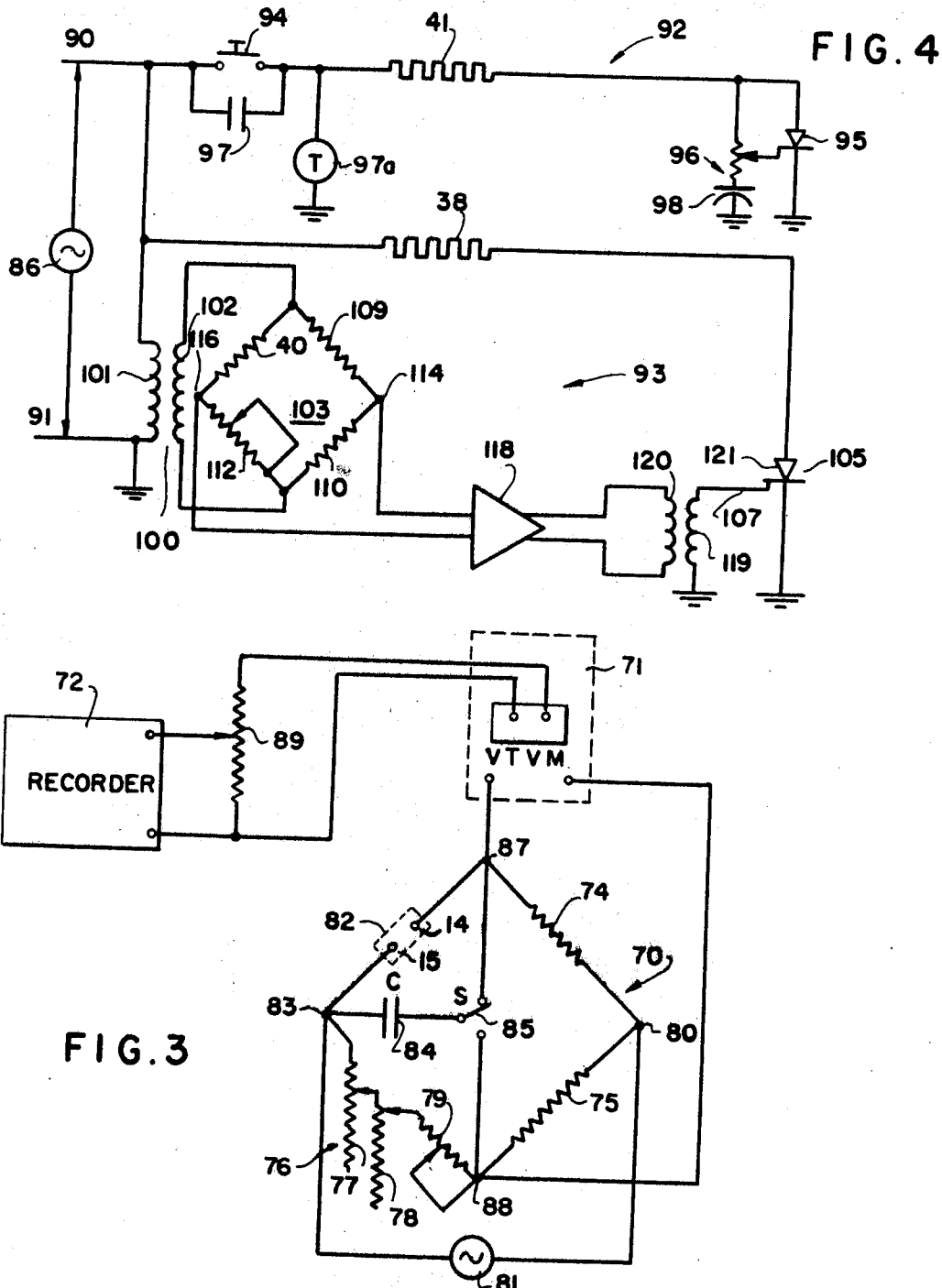

United States Patent Office 3,497,322
Patented Feb. 24, 1970

3,497,322
NITROGEN DETECTOR
Fay L. Boys, Peotone, Ill., assignor to Sinclair Research, Inc., Harvey, Ill., a corporation of Maine
Filed Mar. 30, 1966, Ser. No. 538,710
Int. Cl. G01n *31/10, 31/00*
U.S. Cl. 23—253                                              1 Claim

ABSTRACT OF THE DISCLOSURE

An instrument for measuring concentrations of nitrogen compounds in the parts per million range from a sample test fluid comprising a source of hydrogen gas, a reaction chamber, a nickel catalyst disposed within the reaction chamber, heating means for vaporizing the sample test fluid, a heating coil surrounding the catalyst, a thermal sensor positioned proximate the heating coil, a source of A.C. voltage, a Wheatstone bridge circuit, one of the arms of the bridge being composed of the thermal sensor, means for applying the A.C. voltage source to the Wheatstone bridge to produce a positive output voltage on a positive cycle of the A.C. source when the temperature of the heating coil is lower than about 600 C., a controlled rectifier connected in series with the heating coil and the source of A.C. voltage, and means for applying the positive output voltage to the controlled rectifier to trigger the controlled rectifier into conduction, means for passing the vaporized test sample and the hydrogen gas through the nickel catalyst to reduce the nitrogen compounds present within the sample to ammonia, means to separate hydrogen sulfide from the ammonia, a stream of de-ionized water, means for dissolving the ammonia within the stream of de-ionized water, and means for measuring the electrical conductivity of the ammonia solution.

---

This invention relates to a high sensitivity electronically controlled analytical system capable of measuring nitrogen compound concentrations of less than 1000 parts per million in sample test fluids and, more particularly, to a method and instrument for analytically measuring minute concentrations of nitrogen compounds in sample test fluids by the reduction of the nitrogen compounds to ammonia.

Prior analytical methods of measuring nitrogen compound concentrations less than 1000 parts per million generally have been based upon either the Kjeldahl or Dumas methods, both of which are time consuming and relatively expensive in operation averaging approximately 18 dollars and several hours per test. The Kjeldahl method generally is predicated upon the principle of digesting the nitrogen compound in sulfuric acid, distilling the neutralized acid and subsequently titrating the liberated nitrogen compounds while the Dumas method frees the nitrogen by combustion of the nitrogen organic compounds and subsequently volumetrically determines the analytic ratio of the freed components. Because such methods of determining nitrogen content are deficient economically, new experimental methods for nitrogen analysis have been under investigation by scientists in attempts to provide a high sensitivity, economically feasible nitrogen analyzer.

The method of nitrogen analysis contemplated by this invention includes the vaporizing of the sample test fluid and the subsequent reduction of the nitrogen compounds therein to ammonia by passing a stream of hydrogen gas into contact with the vaporized sample. The gaseous product of the hydrogenation is subsequently passed through a material, e.g. Ascarite, to remove the hydrogen sulfide present in the gaseous product before the formed ammonia is absorbed by a stream of de-ionized water. A measurement of the conductivity of the ammonia solution by a highly sensitive electronic detection circuit provides an indication of the nitrogen concentration in the sample test fluid.

It is, therefore, an object of this invention to provide an inexpensive instrument capable of rapidly measuring nitrogen compound concentrations of less than 1000 parts per million.

It is a further object of this invention to provide a novel method of measuring nitrogen compound concentrations of less than 1000 parts per million by the utilization of a high conversion catalytic agent and a highly sensitive electronic detection and control unit.

The nitrogen reduction in the method of the invention is conducted under reaction conditions which reduce the nitrogen present to ammonia. Although the reduction can be conducted at various efficiencies depending upon the reaction temperature and catalytic agent selected, it is preferred that the reduction be conducted under conditions to effect minimum conversion of nitrogen to ammonia of about 30 to 50%. The about 30 to 50% conversion ratio of nitrogen to ammonia is of particular importance when nitrogen measurements in the parts per million range are desired. Conversions of the present nitrogen compounds to ammonia of about 30 to 50% can be conveniently obtained, for instance, by hydrogenating the test sample at a temperature of about 600° C. in the presence of a nickel catalyst.

The ammonia formed is subsequently passed through a material, e.g. Ascarite or sodium hydroxide, to chemically remove the hydrogen sulfide formed before absorption of the ammonia by a stream of de-ionized water thereby forming an electrolytic solution the conductivity of which is directly dependent upon the concentration of absorbed ammonia. Unless the hydrogen sulfide is removed from the hydrogenated test sample before absorption within the de-ionized fluid stream, it is difficult to differentiate between those conductivity variations of the water produced by the dissolved hydrogen sulfide and the ammonia. A high sensitivity electronic detection circuit having a pair of sensors submerged within the electrolytic solution is utilized to perform a conductivity test thereby producing an output voltage directly dependent on the concentration of the ammonia in the test solution.

When very low nitrogen levels are being analyzed (below 10 parts per million), it generally has been found that washing the entire system with a solution of sodium hydroxide solution and subsequent rinsing with distilled water limits the absorption of the formed ammonia by the sidewalls of the tubing system from which the instrument is fabricated.

The high sensitivity detection circuitry of this invention consists basically of a Wheatstone bridge, one arm of which is formed by the spaced electrodes in the electrolytic solution while a second potentiometric balancing arm having a coarse, medium and fine control is provided within the bridge to obtain bridge balance. The balancing of the bridge is augmented further by switching an adjustable capacitor in parallel across either the spaced electrodes or the potentiometric balancing arm thus compensating for reactant elements which might be present within the components or connections of the bridge. The output of the bridge preferably is displayed on a vacuum tube voltmeter before being forwarded to a recorder for a permanent record.

A constant level of de-ionized water for the absorption of the ammonia formed by the reduction of the nitrogen compounds is maintained within a storage reservoir by an electronically controlled solenoid valve positioned within a tubing line communicating an external supply of water with the storage reservoir while a pair of self-heated, vertically offset thermistors mounted interiorly atop the storage reservoir act as variable arms in a Wheatstone bridge circuit to control the operation of the solenoid valve. As the fluid level within the reservoir drops to a level intermediate the spaced thermistors, the variation in heat dissipation between the air and fluid unbalances the bridge which, in turn, produces a fluctuation in the bridge voltage output to operate the solenoid valve and admit more fluid into the storage reservoir.

The nitrogen analyzer is provided with a vaporization heating coil to convert the liquid test sample deposited within a heating chamber to a vapor just prior to the introduction of the test sample into the hydrogenation chamber. Any attempt to inject the fluid sample directly into a zone of sufficient temperature to produce vaporization results in a volumetric expansion which tends to force a portion of the sample back into fluid entry system thereby adversely affecting subsequent tests. The test sample is, therefore, introduced into the vaporization chamber before a momentary closure of a push button switch energizes a relay to provide sufficient heat to vaporize the sample. The relay and vaporization are de-energized by a timer after a pre-determined period sufficient to vaporize completely the quantity of test fluid deposited in the vaporization chamber.

The second heating circuit functions to maintain the hydrogenation chamber continuously at reducing temperature, e.g. 600° C., and includes a tungsten-rhenium temperature variable resistive filament positioned adjacent the hydrogenation chamber and forming one arm of an A.C. Wheatstone bridge control circuit. The output of the Wheatstone bridge is amplified and utilized to gate a controlled rectifier which functions as a switch to regulate the current flowing through the heating element of the hydrogenation chamber. Thus, the tungsten-rhenium resistor and the controlled rectifier operate to maintain the hydrogenation chamber at the reaction temperature required to effect the high conversion efficiency contemplated for analysis in the parts per million range.

A more complete understanding of the basic principles of this invention can be obtained by reference to the appended drawings in which:

FIGURE 1 is a flow diagram of the nitrogen analyzer;
FIGURE 2 is a sectional view of the nickel powder containing reactor utilized in the nitrogen analyzer;
FIGURE 3 is a circuit diagram of the detection circuitry utilized in the analyzer, and
FIGURE 4 is a circuit diagram of the heater circuitry utilized in the analyzer.

Referring more particularly to FIGURE 1, a stream of gas from hydrogen source 10 is swept through a reaction chamber 11 to reduce the nitrogen compounds present within a fluid test sample deposited therein by syringe 12 to amonia gas which, after removal of the hydrogen sulfide which might be present, is subsequently absorbed by the de-ionized water flowing within extraction cell 13. A pair of spaced electrodes 14 and 15 positioned in contact with the de-ionized water within the extraction chamber measure the conductivity of the fluid which varies proportionally with the amount of ammonia gas dissolved therein, and, therefore, the nitrogen content of the sample.

The flow of hydrogen to reaction chamber 11 is controlled by a toggle valve 16 in hydrogen branch line 17 and solenoid valve 18 positioned within a 0.01″ diameter capillary tube 19 connecting branch line 17 to reaction chamber 11. The small diameter of capillary tube 19 functions as a safety feature in conjunction with toggle valve 16 to limit the flow of hydrogen into the reaction chamber. From the reaction chamber, the exhaust gases flow through a bed of Ascarite 20 positioned within a capillary tubing 21 interconnecting reaction chamber 11 and extraction cell 13. The Ascarite bed chemically removes any hydrogen sulfide produced within the reaction chamber to prevent absorption of the hydrogen sulfide gas within the de-ionized water of the extraction cell and the subsequently erroneous reading associated therewith. A bubbler tube 22 received internally within and extending a majority of the length of extraction cell 13 permits maximum intermingling of the gaseous exhaust from Ascarite bed 20 with the de-ionized water which slowly flows from intake orifice 23 positioned within the top sidewall of extraction cell 13 to exhaust orifice 24 located at the bottom of the cell. Any non-water soluble gases passing through extraction cell 13 are exhausted from a venting orifice 25 which extends through the extraction cell sidewall above the fluid level of the cell. A larger diameter section 29 provided within the upper portion of extraction cell 13 serves as a bubble breaker to reduce fluid losses during operation.

Reaction chamber 11, which can be more clearly seen in FIGURE 2, generally has a sidewall 30 fabricated from Vycor or quartz and is cylindrically shaped having a length of 16″ and a diameter of 7 mm. Stainless steel wool 31 positioned within the reaction chamber at a distance of approximately one inch from intake end 32 initially receiving the hydrogen gas and three inches from exhaust end 33 serves as a retainer for the powdered nickel 34 used as a catalyst during the reduction process. The powdered nickel catalyst generally is located throughout a 10½ inch section of the reactor positioned 2½ inches from the intake end of the reaction chamber thus leaving two stainless steel wool retaining sections 36 and 37 of 1½ inches and 1 inch on the intake and exhaust ends respectively.

The reaction chamber is embraced by a plurality of turns of heating coil 38 which maintains that portion of the stainless steel wool retaining the nickel catalyst and the stainless steel wool exhaust section at about 600° C. Approximately one half inch of the rearmost portion of intake section 36 is also embraced by winding 38 to preheat the gaseous samples before introduction to the catalytic agent 34. In order to regulate the generated temperature of winding 38, a control sensor 40 fabricated from tungsten-rhenium is positioned adjacent the powdered nickel portion of the reactor.

The initial inch of the intake section is embraced by a heating coil 41 capable of producing sufficient heat when energized to vaporize any test sample which might be dispersed within the steel wool intake section 36 during operation. Because the vaporization temperature need not be confined within a closely regulated range, no temperature sensor is provided to regulate the generated heat. While the catalyst employed has been described as nickel powder, other hydrogenation catalysts known to effect the aftermentioned high conversion necessary for measurement in the parts per million range, can be employed. The catalytic metal can be used per se or it can be deposited on a suitable support such as alumina. Illustrative of other suitable catalyst successfully employed in this invention are nickel or nickel and cobalt on alumina containing an alkali or alkaline earth metal hydroxide.

The test sample is introduced into the reaction chamber preferably by means of a 10 micro liter syringe 12 having a 25 gauge 2″ needle. From 5 to 10 micro liters of the test sample are deposited upon the stainless steel wool intake section 36 where it remains until vaporized by heating coil 41 at the initiation of a test cycle.

Referring once again to FIGURE 1, the flow of de-ionized water through extraction cell 13 is controlled by pump 45 which circulates water from the exhaust orifice 24 of the extraction cell through conduits 46 and 47 to reservoir 48 consisting of a resin 49 filled tube 50 utilized for ion exchange. The pure de-ionized water is gravity fed through the reservoir and conduit 52 into the input orifice 23 atop the extraction cell where it again extracts the formed ammonia gas to produce an electrically conductive solution within cell 13.

In order to maintain the fluid level within reservoir 48 at a sufficient level to assure continuous flow of de-ionized water through the extraction cell, a pair of vertically offset 1000 ohm thermistors 54 and 55 are mounted within the sidewall atop reservoir 48 above the resin bed. When the water level above the resin bed drops to a level below the uppermost thermistor 54, the difference in heat dissipation in air and water of the self-heated thermistors produces a measurable variation in their resistances. The two vertically offset thermistors are electrically connected to form two arms of Wheatstone bridge 56, the other two arms of which 57 and 58 are of fixed value and an alternating current source 59 is placed diagonally across the bridge between the juncture formed by the two thermistors and the two fixed resistors respectively. Any unbalance produced by uneven heat dissipation of the thermistors produces an output voltage across junctions 60 and 61 formed by the fixed resistors and the thermistors, respectively, which is subsequently applied to a relay circuit 64 to open water solenoid 65 connecting water source 66 and conduit 47 thereby admitting more water to the circulating system. Thus, an automatic control is provided to eliminate the danger of false readings because of evaporation of the de-ionized water of the system.

The high sensitivity detection circuit of this invention as shown in FIGURE 3 basically includes a Wheatstone bridge 70 one arm of which is formed by the spaced electrodes 14 and 15 positioned within extraction cell 13, a vacuum tube voltmeter 71 for visual indication of the conductivity of the fluid within the extraction cell and a recorder 72 connected across vacuum tube voltmeter 71 for a permanent record of the nitrogen content of the various test samples.

Wheatstone bridge 70 has two arms 74 and 75 formed by identical fixed resistors of 3.9 megohms each, a balancing arm 76 having a coarse 77, medium 78 and fine 79 control to add resistance in increments of 1 megohm, 0.1 megohm and any portion of 100,000 ohms respectively and a fluctuating arm formed by the spaced electrodes 14 and 15 within extraction cell 13. One end of fixed resistors 74 and 75 are joined at point 80 while their opposite ends are connected to one terminal of balancing arm 76 and the electrolysis cell 82 formed by electrodes 14 and 15, respectively. The other terminals of the balancing arm and the electrolysis cell are joined together at point 83 to complete the bridge configuration. A variable capacitor 84, one side of which is connected to point 83, can be paralleled across either cell 82 or balancing arm 76 by the positioning of switch 85 to compensate for reactance components which might be present within the component parts of the bridge or their connection terminals. The bridge is powered by an alternating current voltage source 81 connected across the diagonal formed by the junctures of fixed resistors 74 and 75 and electrolysis cell 82 and balancing resistor 76. Any variation in conductivity of the de-ionized water between spaced electrodes 14 and 15 unbalances the bridge to produce a proportional voltage across output terminals 87 and 88 which voltage is subsequently fed to vacuum tube voltmeter 71 for a visual indication of the conductivity of the solution. An attenuator 89 is parallel across the needle fluctuation voltage coil within meter 71 to feed recorder 72 thereby producing a permanent record of the conductivity of the solution. Because the recorder is potentiometric displaying effectively an infinite impedance at balance, it does not distort the reading of meter 71.

Referring more particularly to the heater control circuits depicted in FIGURE 4, a source of 120 volts alternating current supply 86 is connected across input terminals 90 and 91 to energize both vaporization heater circuit 92 and reaction chamber temperature control circuit 93. Vaporization circuit 92 includes a push button switch 94 in series with vaporization heater coil 41 and controlled rectifier 95. A resistive-capacitive gating circuit 96 is paralleled with controlled rectifier 95 to produce a gating pulse after a fixed energization period of the controlled rectifier. The time constant necessary for the gating circuit to fire controlled rectifier 95 generally is considerably shorter than one half the period of the power frequency applied to the controlled rectifier in order to obtain sufficient heating of the vaporization coil 41 during each positive power cycle. A normally open Industrial Timer contact 97 is connected in parallel with push button switch 94 with a single shot control relay coil 97A being connected from the normally de-energized side of contact 97 to ground to control the operation of the contact.

When a test sample is to be vaporized, push button 94 is depressed to initiate charging of gating circuit 96 and energization of Industrial Timer coil 97A which, thereupon, operates to maintain contacts 97 closed for a fixed period. After release of push button switch 94 the charging of the gating circuit continues through closed bypass contacts 97 until capacitor 98 of gating circuit 96 is charged to a voltage sufficient to trigger controlled rectifier 95 into conduction thus effectively placing the inlet heater directly across power line 90 and ground for the remainder of the positive cycle of the power source. Conduction of the controlled rectifier is terminated by the advent of the negative portion of each power cycle upon lead 90 only to be resumed upon the next succeeding positive half cycle when the sequence of charging and initiation of conduction of controlled rectifier 95 are repeated until the period of the Industrial Timer 97 expires terminating energization of coil 41. Coil 41 remains de-energized until push button 94 is again depressed.

The reaction chamber temperature control circuit 93 is fed by power supply 86 and includes transformer 100 having a primary winding 101 and a secondary winding 102, a Wheatstone bridge 103, one arm of which 40 is formed by the tungsten-rhenium resistor positioned adjacent reaction chamber 11 and a controlled rectifier 105 to regulate the power through reaction chamber heating coil 38. The reactor heater 38 is connected in series with controlled rectifier 105 across transformer primary winding 101 to permit current flow through the heater on positive half cycles of power supply 86 when as positive voltage on the gate 107 of the controlled rectifier triggers it into conduction. Thus, the amount of current flowing through heater 38 is regulated by the phase relationship between the positive cycle of the power pulse 86 and a positive gating pulse applied to the gate of the controlled rectifier.

The gating circuitry regulating the phase relationship includes transformer secondary winding 102 connected as a power source across one diagonal of Wheatstone bridge 103. The bridge is composed of a tungsten-rhenium temperature variable resistor 40 positioned adjacent reaction chamber 11, two fixed resistors 109 and 110 and a variable resistance balancing arm 112. One end of each of fixed resistors 109 and 110 are joined at point 114 while their opposite terminals are connected to one end of tungsten-rhenium resistor 40 and balancing resistor 112, respectively. The other ends of the tungsten-rhenium resistor and balancing resistor 112 are joined together at point 116 to complete the bridge circuitry. The power input from transformer winding 102 is applied across the terminals formed by the junctures of the two fixed resistors 109 and 110 and the tungsten-rhenium and balancing resistors while the output is detected across the terminal points 114 and 116. The output of bridge 103 is subsequently amplified in amplifier 118 and fed to coil 119 through winding 120 to trigger controlled rectifier 105. As the furnace temperature rises, the resistance of tungsten-rhenium sensor 40 increases until it exceeds the resistance of set point potentiometer 112 at which time the out of balance voltage of the bridge being fed to amplifier 118 reverses phase and the amplified signal to the controlled rectifier gate 107 is negative during the half cycle that the controlled rectifier anode 121 is positive thereby blocking current flow through heater 38.

In operation, water is added to reservoir 48 until the fluid system is filled and toggle valve 16 is opened to permit hydrogen flow through the system. A fixed quantity of test fluid is injected by syringe 12 into stainless steel wool retaining section 36 and push button 94 is depressed to vaporize the test sample. The flowing hydrogen stream draws the vaporized sample over powdered nickel catalyst 34 within the reaction chamber where the nitrogen compounds within the test sample are reduced to soluble ammonia gas which, after passing through hydrogen sulfide remover 20, is subsequently absorbed within the flowing fluid in extraction cell 13. The dissolution of the ammonia varies the electrical conductivity of the flowing deionized water in the extraction cell producing an output voltage from Wheatstone bridge 70 which is displayed upon vacuum tube voltmeter 71.

After a series of tests have been run, catalyst 34 will require regeneration to remove the coke formed thereon during testing. Toggle valve 16 is closed to block the flow of hydrogen and toggle valve 125 is opened to pass a nitrogen purge from nitrogen source 127 through the system. After a period of about five minutes, valve 125 is closed terminating nitrogen flow and Ascarite tube 20 is replaced with an empty glass tube. Toggle valve 128 is then opened to permit air from source 129 to flow through the system for at least one hour at a temperature of 1050° F. (900–1200° F.) thereby removing the coke while converting the nickel to nickel oxide. The system is purged with nitrogen for about five minutes. Hydrogen is then admitted to reduce the nickel oxide to nickel and the water formed thereby is eluded from the system by the hydrogen flow. The hydrogen subsequently is purged from the system by nitrogen from source 127. The glass tube is replaced with a fresh Ascarite tube 20 and valve 16 is opened to resume the flow of hydrogen gas thereby readying the system for a subsequent series of tests.

It is claimed:

1. An instrument for measuring concentrations of nitrogen compounds in the parts per million range from a sample test fluid comprising a source of hydrogen gas, a reaction chamber, a nickel catalyst disposed within said reaction chamber, heating means for vaporizing said sample test fluid, a heating coil surrounding said catalyst, a thermal sensor positioned proximate said heating coil, a source of A.C. voltage, a Wheatstone bridge circuit, one of the arms of said bridge being composed of said thermal sensor, means for applying said A.C. voltage source to said Wheatstone bridge to produce a positive output voltage on a positive cycle of said A.C. source when the temperature of said heating coil is lower than about 600° C., a controlled rectifier connected in series with said heating coil and said source of A.C. voltage, and means for applying said positive output voltage to said controlled rectifier to trigger said controlled rectifier into conduction, means for passing the vaporized test sample and the hydrogen gas through the nickel catalyst to reduce the nitrogen compounds present within said sample to ammonia, means to separate hydrogen sulfide from said ammonia, a stream of de-ionized water, means for dissolving said ammonia within said stream of de-ionized water, and means for measuring the electrical conductivity of said ammonia solution.

References Cited

UNITED STATES PATENTS 2,589,758 3/1952 Wojciechowski.
3,182,252 5/1965 Van Den Berg _____ 324—30

OTHER REFERENCES

Hendricks et al., Anal. Chem. 14, No. 1, 23–26 (1942).
Field et al., Anal. Chem. 18, No. 11, 665–7 (1946).
King et al., Anal. Chem. 28, No. 2, 255–8 (1956).

MORRIS O. WOLK, Primary Examiner

R. M. REESE, Assistant Examiner

U.S. Cl. X.R.

204—1, 195; 324—30